United States Patent
Padmanabhan et al.

(10) Patent No.: US 11,571,831 B2
(45) Date of Patent: Feb. 7, 2023

(54) SYSTEM AND METHOD FOR KICKBACK DETECTION BASED ON BLADE SPEED IN A POWER TOOL

(71) Applicants: Robert Bosch Tool Corporation, Broadview, IL (US); Robert Bosch GmbH, Stuttgart (DE)

(72) Inventors: Deepak Padmanabhan, Rochester Hills, MI (US); Brett Huber, Arlington Heights, IL (US)

(73) Assignee: Robert Bosch GmbH, Stuttgart (DE)

( * ) Notice: Subject to any disclaimer, the term of this patent is extended or adjusted under 35 U.S.C. 154(b) by 1091 days.

(21) Appl. No.: 14/865,460

(22) Filed: Sep. 25, 2015

(65) Prior Publication Data

US 2016/0089810 A1    Mar. 31, 2016

Related U.S. Application Data

(60) Provisional application No. 62/055,147, filed on Sep. 25, 2014.

(51) Int. Cl.
| | |
|---|---|
| *B27G 19/02* | (2006.01) |
| *B27B 5/38* | (2006.01) |
| *F16P 3/00* | (2006.01) |
| *B23D 59/00* | (2006.01) |

(52) U.S. Cl.
CPC ........... *B27G 19/02* (2013.01); *F16P 3/00* (2013.01); *B23D 59/001* (2013.01); *B27B 5/38* (2013.01)

(58) Field of Classification Search
CPC .................................. B27B 5/38; B27G 19/02
See application file for complete search history.

(56) References Cited

U.S. PATENT DOCUMENTS

| | | | | |
|---|---|---|---|---|
| 4,249,117 A | * | 2/1981 | Leukhardt | B23D 59/008 |
| | | | | 318/434 |
| 4,267,914 A | * | 5/1981 | Saar | B23Q 11/04 |
| | | | | 173/181 |
| 4,509,484 A | * | 4/1985 | Gertiser | F02D 41/1498 |
| | | | | 123/436 |

(Continued)

FOREIGN PATENT DOCUMENTS

| | | |
|---|---|---|
| AU | 558038 B2 | 1/1987 |
| CN | 201152938 Y | 11/2008 |

(Continued)

OTHER PUBLICATIONS

International Search Report and Written Opinion corresponding to PCT Application No. PCT/US2015/052245, dated Jan. 4, 2016 (14 pages).

*Primary Examiner* — Kenneth E Peterson
(74) *Attorney, Agent, or Firm* — Maginot, Moore & Beck LLP

(57) ABSTRACT

A method of detecting and mitigating kickback in a saw includes identification of a running average speed (RPM) of a saw blade, the speed at a given time sample relative to the running average speed, the percentage change in speed from one speed sample to the previous speed sample, and the percentage change in average speed based on the current speed of the saw blade. If the identified speed profile from the samples indicates a kickback is imminent, then the saw identifies an imminent kickback event and removes power from the saw motor to mitigate kickback.

13 Claims, 5 Drawing Sheets

(56) References Cited

U.S. PATENT DOCUMENTS

| | | | |
|---|---|---|---|
| 5,263,453 A * | 11/1993 | Wakahara et al. ..... | G01M 15/11 123/436 |
| 5,373,732 A * | 12/1994 | Kuroda et al. ......... | G01M 15/11 73/114.04 |
| 7,055,417 B1 | 6/2006 | Gass | |
| 7,190,145 B2 * | 3/2007 | Grand et al. .............. | H02P 6/15 318/400.13 |
| 7,698,978 B2 | 4/2010 | Shibata | |
| 2004/0123662 A1 * | 7/2004 | Boucher et al. ...... | G01P 21/025 73/507 |
| 2010/0064532 A1 | 3/2010 | Wittke et al. | |
| 2010/0257743 A1 | 10/2010 | George | |
| 2011/0226105 A1 | 9/2011 | Butler et al. | |
| 2012/0036725 A1 | 2/2012 | Osborne et al. | |
| 2013/0063304 A1 * | 3/2013 | O'Regan et al. ....... | B63B 22/24 342/357.55 |
| 2014/0216220 A1 | 8/2014 | Mehta et al. | |
| 2016/0046035 A1 * | 2/2016 | Laghate et al. ........ | B27G 19/02 83/13 |

FOREIGN PATENT DOCUMENTS

| | | |
|---|---|---|
| CN | 103068537 A | 4/2013 |
| EP | 0 018 626 A1 | 11/1980 |

\* cited by examiner

SYSTEM AND METHOD FOR KICKBACK DETECTION BASED ON BLADE SPEED IN A POWER TOOL

CROSS-REFERENCE TO RELATED APPLICATIONS

This application claims priority to U.S. Provisional Application Ser. No. 62/055,147 entitled "System And Method For Kickback Detection Based On Blade Speed In A Power Tool" by Padmanabhan et al., filed Sep. 25, 2014, the disclosure of which is hereby incorporated herein by reference in its entirety.

TECHNICAL FIELD

This disclosure relates generally to power tools, and, more specifically, to systems and methods for detecting kickback during operation of a circular saw or other power tool.

BACKGROUND

Power saws and circular saws in particular are commonly used for cutting work pieces such as wood. In some operating conditions, a power saw experiences kickback. For handheld power saws, kickback occurs when the saw physically recoils from the work piece instead of cutting through the work piece. In a table saw, kickback occurs when a work piece recoils from the saw blade instead of being cut by the saw blade. Existing saws include riving knives, guide rails and other guards that help to reduce the occurrences of kickback. These saws, however, cannot detect when kickback occurs and therefore cannot implement steps, such as engaging a blade arresting device or blade drop device, to reduce or eliminate the kickback that do not require manual intervention from the operator. Consequently, systems and methods that enable detection and mitigation of kickback during operation without requiring operator intervention would be beneficial.

SUMMARY

A non-destructive method for detection and mitigation of kickback in a circular saw or other power tool. The method does not require manual intervention from an operator. The circular saw autonomously deactivates the saw motor in response to detection of a kickback event even if the operator continues to pull an activation trigger to operate the saw.

The circular saw detects kickback events and deactivates the tool to mitigate the effects of kickback. The embodiments described herein are applicable to a wide variety of circular saw variants, as well as other high speed cutting tools that experience kickback.

DETAILED DESCRIPTION

For the purposes of promoting an understanding of the principles of the embodiments described herein, reference is now made to the drawings and descriptions in the following written specification. No limitation to the scope of the subject matter is intended by these references. This patent also encompasses any alterations and modifications to the illustrated embodiments as well as further applications of the principles of the described embodiments as would normally occur to one of ordinary skill in the art to which this document pertains.

As used herein, the term "speed" as used to describe a saw blade or other rotating implement in a power tool refers to the rate of rotation of the saw blade or implement. The rate of rotation for a saw blade is typically expressed in rotations per minute (RPM), although any other measurement of the rate of rotation for a saw blade is also appropriate to describe the speed of the saw blade.

As described below, kickback detection processes in a saw identify the occurrence of a kickback event to enable the saw to deactivate a motor or engage a blade arrest device to reduce or eliminate the effects of the kickback. In the discussion below, a reference to a kickback detection process performing an action or function refers to the operation of a controller, such as a digital control device, involving execution of stored program instructions which are configured to cause the controller to perform the function or action in conjunction with other components in a saw.

Figure 1:
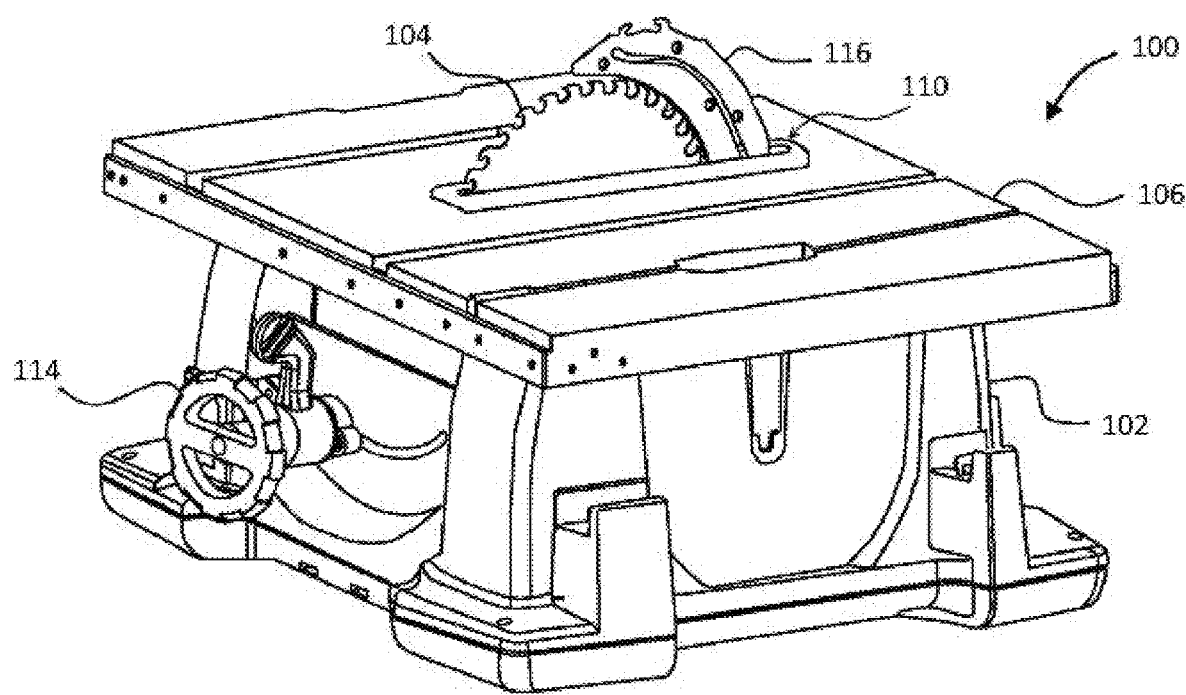
FIG. 1 is a perspective view of an embodiment of a saw that may be configured to detect and respond to kickback.

FIG. 1 depicts an example of a saw 100 that is configured to perform the kickback detection process that is described below. As depicted in FIG. 1, the saw 100 may comprise a table saw including a base 102 with a table top 106. The table top 106 defines a blade slot 110 through which a saw blade 104 extends. A motor 108 (FIG. 2) for driving the saw blade 104 is located within the base 102 as well as a positioning assembly (not shown) that enables the saw blade 104 to be moved vertically in relation to the base to change the height of the blade above the table top. The positioning assembly may also be configured to enable the blade to be pivoted to change the bevel angle of the blade with respect to the table top. The height and bevel angle may be adjusted, for example, by using the wheel mechanism 114 provided on the side of the base 102. The saw 100 may include other features such as a riving knife 116 and a rip fence (not shown).

Figure 2:
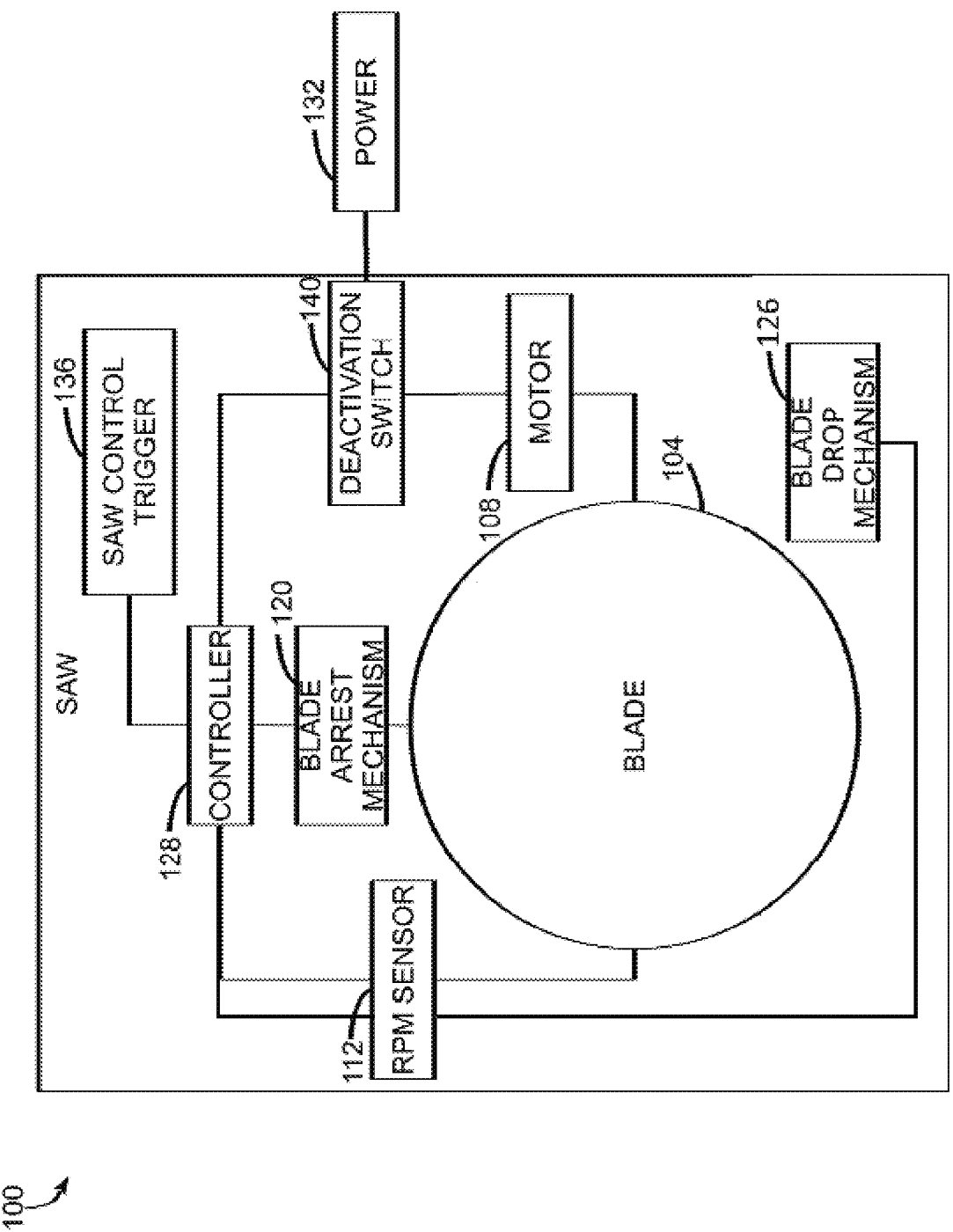
FIG. 2 is a schematic diagram of a saw configured to detect and respond to kickback, such as the saw of FIG. 1.

As depicted in FIG. 2, the saw 100 includes a rotating blade 104, motor 108, a rotational sensor 112 that detects rotations per minute (RPM) or other suitable rotational speed of the blade 104, a digital controller 128, a manual saw control trigger 136, and a motor deactivation switch 140. The saw 100 is configured to operate using electrical power that is received from an electrical power source 132, such as an electrical outlet, battery, or other suitable electrical power source. The RPM sensor 112 is, for example, a Hall Effect sensor, rotary encoder, or any other suitable sensor that measures an actual rate of rotation for the blade 104. The motor 108 is an electric motor that receives electrical power from the power supply 132, which is a battery or a connection to an electric utility grid in some common embodiments. The motor 108 rotates a drive shaft that engages the blade 104 to rotate the blade 104 during operation of the saw 100.

The digital controller 128 is, for example, a microcontroller, microprocessor, field programmable gate array (FPGA), or other suitable digital processing device that is configured to detect kickback in the saw 100. The controller 128 incorporates or is operatively connected to a memory device that stores both programmed instructions and saw data used in controlling the saw and performing various functions. One of the functions of the controller 128 is to implement a process or algorithm for detecting kickback events of the saw blade and to activate kickback mitigation measures when kickback events are detected which is explained in more detail below. The kickback mitigation measures can include operating the deactivation switch 140 to disconnect the motor from the power source in response to detecting a kickback event. The saw 100 may also be equipped with various other kickback mitigation mechanisms that may be activated or engaged in response to the detection of a kickback event. For example, the saw 100 may include a blade arrest mechanism 120, or blade braking mechanism, that is configured to halt the rotation of the blade quickly when activated. The saw 100 may include a blade drop mechanism 126 that enables the saw blade to be dropped instantaneously below the upper surface of the table top when activated.

To detect kickback events, the controller 128 is configured to monitor the rotation speed of the saw blade. To monitor the rotation speed of the blade, the controller 128 samples the output signal from the RPM sensor 112 at a predetermined sampling rate and processes the samples to determine the rotation speed. The controller is configured to maintain a moving average of the rotation speed indicated by the samples. For example, after each sample of the output signal is taken, i.e., for each sampling cycle, the controller determines a current average blade speed which corresponds to the rotation speed indicated by the current sample of the output signal averaged with the rotation speeds from a predetermined number of previous sampling cycles. The controller compares the current average blade speed to the previous average blade speed (i.e., the current average blade speed of the previous sampling cycle) and is configured to use the comparison as the basis for detecting kickback events.

During a kickback event the blade rotation speed is reduced for a short time as a result of the saw blade becoming jammed into the work piece. A full kickback event may last for roughly 250 ms so there is a limited amount of time to detect and then to mitigate a kickback. If kickback mitigation measures are not activated within roughly 100 ms from the beginning of the kickback event, then the mitigation measures may be too late to have any impact. Therefore, the sampling rate is selected to enable a kickback event to be detected so that mitigation measures can be activated fast enough, e.g., within approximately 100 ms from the start of the kickback event. With this in mind, in one embodiment, the controller 128 is configured to sample the rotation speed of the blade at a rate of 1000 samples per second, or 1 sample per millisecond. The sampling rate used may be faster or slower depending in part on the type of RPM sensor and the hardware being used for the controller. The number of samples used to compute the average blade speed should not be too great so that changes in rotation speed have little to no impact on the average and should not be too small such that the average changes greatly from cycle to cycle so that changes in rotation speed indicative of kickback events are too difficult to discern. In one embodiment, the current average blade speed is an average of the last 400-500 samples (i.e., 400 ms-500 ms worth of samples) although any suitable number of samples may be used to compute the average.

In one embodiment, the controller 128 is configured to detect a kickback event based on a percentage difference between the current average blade speed and the previous average blade speed. For example, the controller 128 may be configured to detect a kickback event when the percentage difference between the current average blade speed and the previous average blade speed is greater than a predetermined percentage difference threshold value. The percentage difference threshold value that is used depends in part on the number of samples used to compute the averages. In one embodiment, the predetermined percentage difference threshold value is at least 0.003%.

The controller 128 may be configured to use the percentage difference determination as one indicator of a possible kickback event. In addition to calculating the percentage difference percentage difference between the current average blade speed and the previous average blade speed, the controller may be configured to also determine the percentage difference between the speed value from the current sample relative to the previous sample (e.g. between the current moment in time and 1 ms before). In this embodiment, the controller 128 may be configured to identify a kickback event when the percentage difference between the current average blade speed and the previous average blade speed is greater than a threshold value and the percentage difference between the speed value from the current sample relative to the previous sample is greater than a threshold value. For example, the controller 128 may be configured to identify a kickback event when the percentage difference percentage difference between the current average blade speed and the previous average blade speed is greater than 0.003% and the percentage difference between the speed value from the current sample relative to the previous sample is greater than zero.

The controller 128 may be configured to take other metrics into consideration in detecting a kickback event. For example, the controller 128 may also be configured to compare the current blade speed sample with a predetermined percentage of the current average blade speed. In one embodiment, the controller is configured to compare the current blade speed value to 98% of the current average blade speed. A kickback event may be indicated when the current blade speed is less than or equal to 98% of the current average blade speed.

The controller may be configured to use one of the above metrics, a combination of more than one metric, or all of the above metrics in identifying a kickback event. For example, the controller 128 may be configured to identify a kickback event when all of the above conditions are met, i.e., when the percentage difference between the current average blade speed and the previous average blade speed is greater than a predetermined percentage difference threshold value, when the percentage difference between the current average blade speed and the previous average blade speed is greater than a threshold value, and when the current speed value is less than a predetermined percentage (e.g., 98%) of the current average blade speed.

Figure 3A:
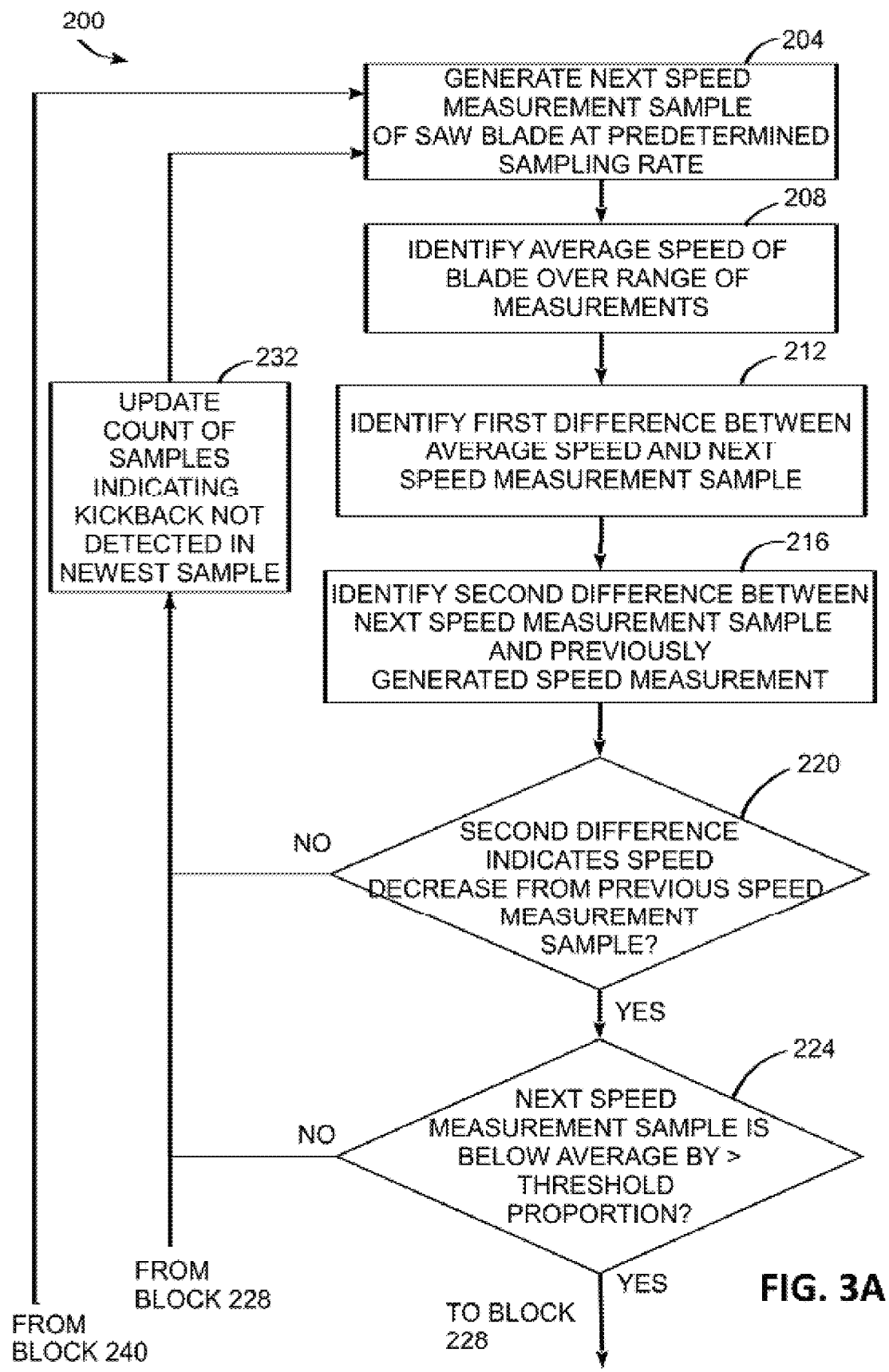
FIGS. 3A and 3B depict a block diagram of a process for detecting kickback during operation of a saw that may be implemented in the saw of FIGS. 1 and 2.
Figure 3B:
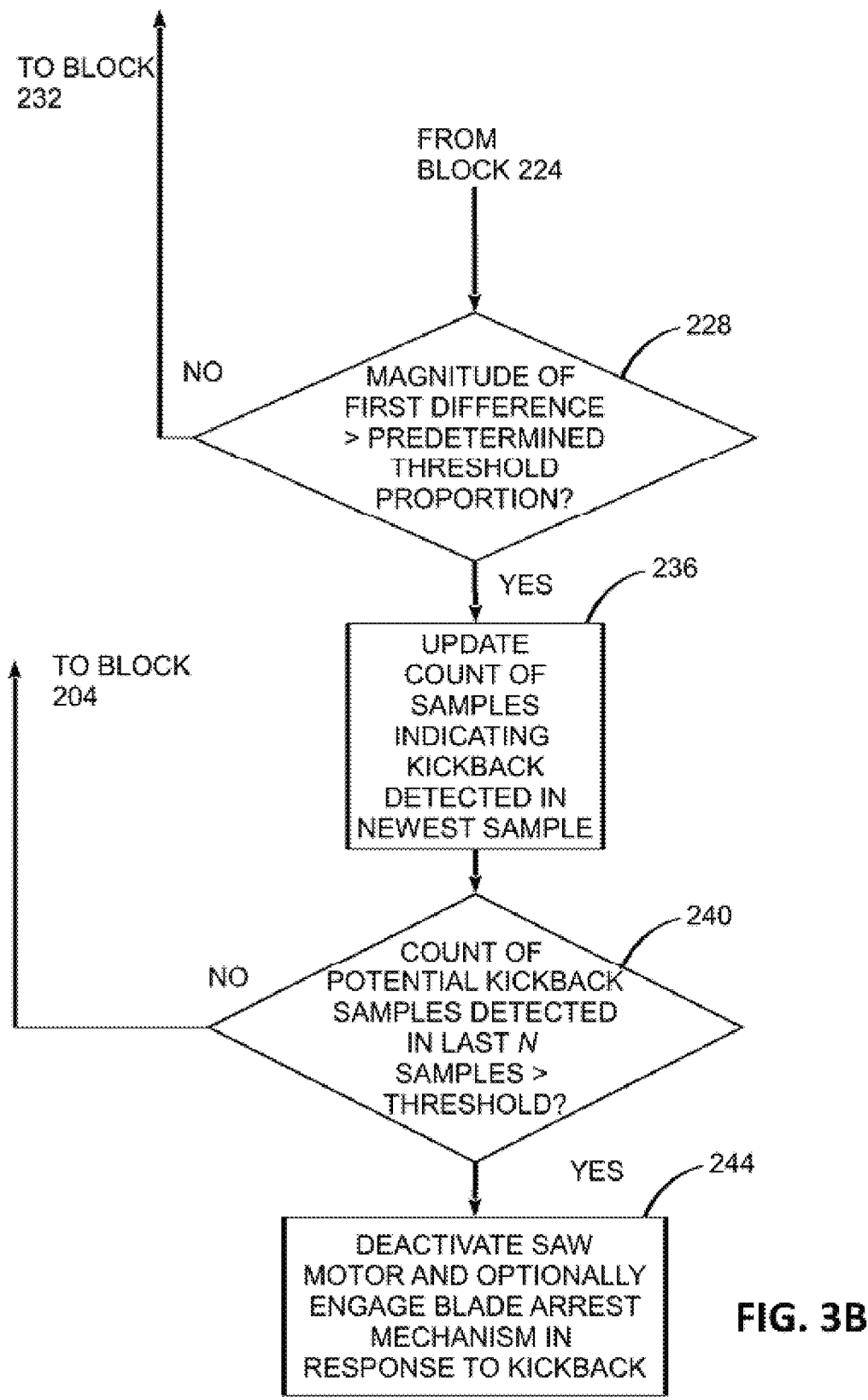

FIGS. 3A and 3B depict a process 200 for detection and mitigation of kickback in a circular saw that may be implemented by the controller 128. In the discussion below, a reference to the process 200 performing a function or action refers to the operation of a controller to execute stored program instructions to implement the function or action in association with other components in a saw. The process 200 is described in conjunction with the saw 100 of FIG. 2 for illustrative purposes.

Process 200 occurs during operation of the saw 100. As the saw blade 104 is rotated, the controller 128 receives the output from the RPM sensor 112 indicating the rotating speed of the saw blade. The controller processes the output of the RPM sensor to generate a series of measurement samples for the speed of the saw blade 104. In the embodiment of the saw 100, the controller 128 generates the measurement samples at a predetermined sampling rate, such as one sample every millisecond (1,000 samples per second). Alternative embodiments can sample at a higher or lower rate as long as the sampling rate is high enough to enable the controller to identify a kickback event and take a mitigating action within a predetermined period of time, such as within 100 milliseconds of detecting that a kickback event is occurring or is imminent.

In the process diagram of FIGS. 3A and 3B, the controller 128 generates a next speed measurement sample (B) at the predetermined sampling rate based on a signal from the RPM sensor 112 (block 204). As described above, the controller 128 receives the current speed measurement from the RPM sensor 112. The "next" speed sample is also referred to as the current time speed sample since the controller 128 uses the next speed sample as a representation of the current speed of the saw blade 104 during each iteration of the process 200.

Figure 4:
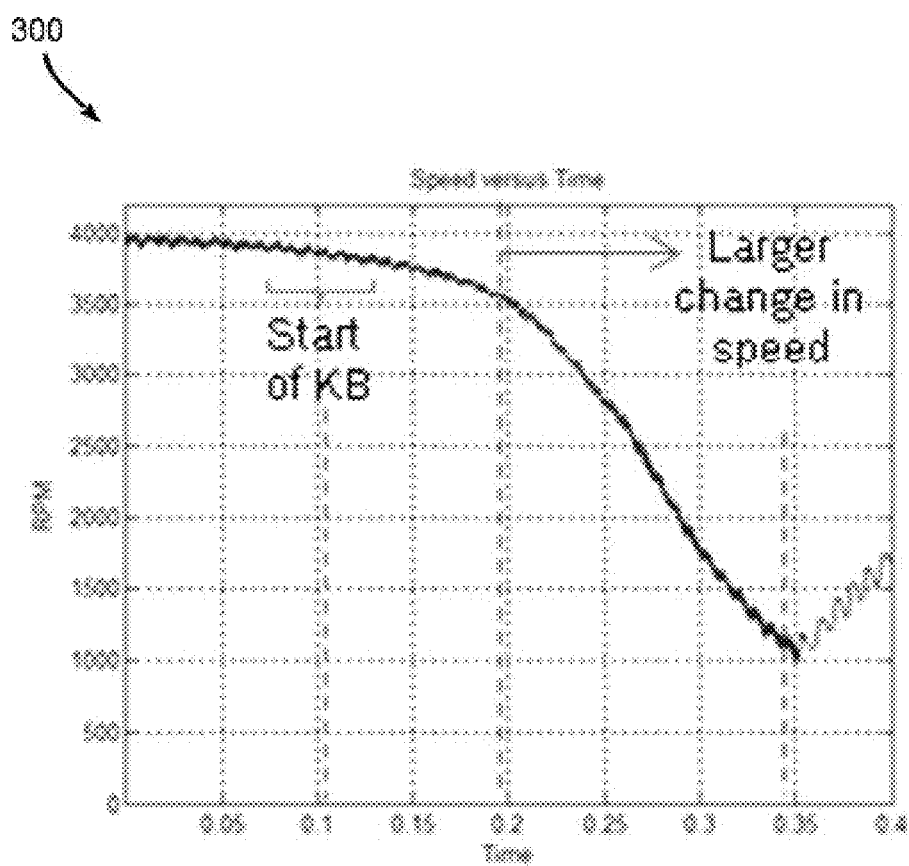
FIG. 4 is a graph depicting a change in saw blade rotational rate during a kickback event.

The controller 128 also stores a history of previous speed measurement samples over a predetermined time period (e.g. 400-500 milliseconds) in a memory. During process 200, the controller 128 identifies an average speed of the blade (A) over the range of measurements including the most recent measurement and the history of blade speed measurements that are stored in the memory (block 208). During process 200, the controller 128 identifies a first difference (G) between the most recently measured speed sample and the identified average blade speed A (block 212). In some embodiments, the most recently measured blade speed to average blade speed difference is expressed as a percentage G of the average blade speed A to identify a relative magnitude of the speed difference. The controller 128 also identifies a second difference H between the next speed measurement sample and a previous speed measurement sample for the saw blade 104 (block 216). In the saw 100, the controller 128 uses the speed measurement sample that was generated immediately prior to generation of the next speed measurement sample as the previous speed measurement, but in alternative embodiments optionally use another one of the prior speed measurement samples to identify H. In the embodiment of FIG. 4, the second difference H is expressed as a percentage difference of the prior blade speed measurement sample to the next measured speed sample of the blade 104, so a positive value of H indicates that the saw blade speed is increasing over time and a negative value of H indicates that the saw blade speed is increasing over time. The processing that is described in blocks 212 and 216 can occur in any order or concurrently during the process 200.

Process 200 continues as the controller 128 identifies if the next measured speed sample is indicative of a potential kickback event. The process 200 does not identify a kickback event based on only one speed measurement sample because of the potential for measurement noise and other operating factors to indicate that a kickback event is occurring or is imminent when no kickback event actually occurs (a false-positive result). Instead, the process 200 identifies if a sufficient proportion of multiple speed measurement samples within a predetermined time period each meet the criteria for a potential kickback event to identify that a kickback event is occurring or is imminent.

During the process 200, the controller 128 identifies three operating factors related to changes in the speed of the saw blade 104 using the next speed measurement sample and the stored history of speed measurement samples. The controller 128 identifies if the second difference between the previously measured speed sample and the next speed sample indicates that the saw blade speed is decreasing over time (e.g. H>0%) (block 220); if the next measured speed sample is below the average blade speed by more than a predetermined threshold proportion (e.g. if the next measured blade speed sample B is less than 98% or another predetermined percentage of the average blade speed A identified during the processing of block 208) (block 224); and if the magnitude of the first proportional difference between the next measured blade speed sample and the average blade speed exceeds another predetermined proportional threshold (e.g. G>0.3% or another predetermined percentage) (block 228). The controller 128 performs the processing of blocks 220-228 in any order or concurrently.

If the results of the processing for any of blocks 220-228 result in negative ("NO") results, then the next speed measurement sample is not indicative of a kickback event. The controller 128 maintains counts of samples that indicate kickback and that do not indicate kickback over a predetermined number of N previous samples (e.g. N=15 previous samples). The controller 128 updates the counter to indicate that the next speed measurement sample does not correspond to a kickback event (block 232) and continues to block 204 to process the next speed measurement sample from the RPM sensor 112. The counter identifies a total number of samples in a window of up to N previous samples that indicate a potential kickback event. For example, in one configuration the controller 128 identifies a kickback event if the counter meets or exceeds a value of 10 over a window of N=15 samples (66% of the samples indicate a kickback event).

If the results of the processing in all of the blocks 220-228 is positive ("YES"), then the controller 128 identifies that the next speed measurement sample is indicative of a potential kickback event, and the controller 128 updates the counter of speed measurement samples that indicate the occurrence of a potential kickback event (block 236). As described above, a single sample or low frequency of samples that indicate a potential kickback can occur due to noise, so the process 200 returns to block 204 if the counter values over the N previous samples do not exceed a predetermined threshold (e.g. counters indicate that less than 10 samples out of the previous 15 (66%) indicate kickback) (block 240). If, however, the counters exceed the threshold (block 240), then the controller 128 identifies that a sufficient proportion of recently generated samples indicate that a kickback event is occurring or is imminent (block 240). The controller 128 deactivates the saw motor 108 and optionally engages a blade arrest mechanism 120 to prevent or mitigate the kickback event (block 244). In the saw 100, the controller 128 operates the motor deactivation switch 140 to disconnect the motor 108 from the power source 132. The motor 108 remains deactivated even if the operator continues to operate the saw 100 using the saw control trigger 136. In some embodiments, the operator clears the work piece and manually resets the deactivation switch 140 prior to subsequent operation of the saw 100. The kickback detection process 200 occurs during a comparatively short time period. For example, in many practical saw embodiments, the saw detects that a kickback even is beginning or is imminent and deactivates the motor within a period of approximately 100 milliseconds or less.

FIG. 4 depicts a graph 300 of measured blade speed samples over time during a kickback event in a circular saw.

As depicted in FIG. 4, the kickback involves a gradual decrease in speed initially, followed by a much larger drop in speed later in the event. FIG. 4 depicts speed data points that are collected at a sampling rate of 1,000 samples per second. The first 100 milliseconds show a gradual drop in speed, and then the subsequent 150 milliseconds show a much larger slope with a more rapid decrease in blade speed. The controller 128 identifies multiple characteristics for the change in blade speed over time to improve the effectiveness of kickback detection and mitigation during the first 100 milliseconds in the graph 300. For example, the blade speed drops during a kickback event (H>0), the next speed measurement sample must be sufficiently lower than the running average to indicate a potential kickback (B≤cA where c=0.98 or another suitable percentage threshold), and the magnitude of the next speed measurement sample for the blade 104 should deviate from the running average blade speed by more than a predetermined threshold proportion (G>0.3%). The prompt detection of kickback events enables the controller 128 to deactivate the motor 108 and optionally engage the blade arrest mechanism 120 with sufficient time to mitigate the negative impact of the kickback event.

It will be appreciated that variants of the above-described and other features and functions, or alternatives thereof, may be desirably combined into many other different systems, applications or methods. In particular, while the illustrative embodiments described herein are directed to circular saws, the methods described herein are also suitable for kickback detection and mitigation in other power tools that employ rotating implements. Various presently unforeseen or unanticipated alternatives, modifications, variations or improvements may be subsequently made by those skilled in the art that are also intended to be encompassed by the following embodiments.

What is claimed is:

1. A method of operating a power saw, comprising:
    detecting whether a kickback event of a saw blade of the power saw has occurred by:
        sensing a rotation speed of the saw blade using a sensor, and using the sensor to output a signal indicative of the rotation speed of the saw blade as the saw blade is being operated;
        using a controller to sample the output signal at a predetermined sampling rate to determine the rotation speed of the saw blade;
        after each sample of the output signal, determining a current average blade speed, the current average blade speed corresponding to an average of the rotation speed indicated by a current sample of the output signal with the rotation speeds indicated by a predetermined number of previous samples of the output signal; and
        after determining the current average blade speed, comparing the current average blade speed with a previous average blade speed, the previous average blade speed corresponding to the current average blade speed calculated for a previous sample of the output signal,
    wherein the comparison of the current average blade speed with the previous average blade speed further comprises:
        determining a first percentage difference between the current average blade speed and the previous average blade speed, and
        determining that the kickback event of the saw blade has occurred when the first percentage difference is greater than a first predetermined percentage difference threshold value, and
    wherein the method further comprises:
        comparing the rotation speed indicated by the current sample to the rotation speed indicated by the previous sample;
        determining a second percentage difference between the rotation speed indicated by the current sample to the rotation speed indicated by the previous sample; and
        determining that the kickback event of the saw blade has occurred when the first percentage difference is greater than a first predetermined percentage difference threshold value and the second percentage difference is greater than a second predetermined percentage difference threshold value.

2. The method of claim 1, wherein the predetermined sampling rate is at least 1 sample per millisecond.

3. The method of claim 2, wherein the predetermined number of samples is at least 100.

4. The method of claim 3, wherein the predetermined number of samples is at least 400.

5. The method of claim 1, wherein the first predetermined percentage difference threshold value is at least 0.003%.

6. The method of claim 1, wherein the first predetermined percentage difference threshold value is at least 0.003%, and wherein the second predetermined percentage difference threshold value is 0.

7. The method of claim 1, further comprising:
    calculating a predetermined percentage of the current average speed value; and
    determining that a kickback event of the saw blade has occurred when the first percentage difference is greater than a first predetermined percentage difference threshold value, the second percentage difference is greater than a second predetermined percentage difference threshold value, and the blade speed indicated by the current sample is less than or equal to the predetermined percentage of the current average speed value.

8. The method of claim 7, wherein the first predetermined percentage difference threshold value is at least 0.003%, wherein the second predetermined percentage difference threshold value is 0, and wherein the predetermined percentage is 98%.

9. The method of claim 7, wherein detecting a kickback event further comprises:
    determining that a kickback event of the saw blade has occurred when, for a predetermined number of samples within the predetermined amount of time, the first percentage difference is greater than a first predetermined percentage difference threshold value, the second percentage difference is greater than a second predetermined percentage difference threshold value, and the blade speed indicated by the current sample is less than or equal to the predetermined percentage of the current average speed value for a predetermined number of samples within the predetermined amount of time.

10. The method of claim 9, further comprising:
    activating kickback mitigating measures in response to detecting a kickback event.

11. The method of claim 9, wherein the kickback mitigating measures include deactivating a motor that drives the saw blade.

12. The method of claim 9, wherein the kickback mitigating measures include activating a blade braking mechanism.

13. The method of claim 9, wherein the kickback mitigating measures include activating a blade drop mechanism.

* * * * *